United States Patent
Yu et al.

(10) Patent No.: US 8,909,152 B2
(45) Date of Patent: Dec. 9, 2014

(54) AUTOMATIC-SWITCHING WIRELESS COMMUNICATION SYSTEM AND METHOD

(75) Inventors: Robin Yu, Taipei (TW); Peter Sun, Taipei (TW)

(73) Assignee: Nfore Technology Co., Ltd., Taipei (TW)

(*) Notice: Subject to any disclaimer, the term of this patent is extended or adjusted under 35 U.S.C. 154(b) by 239 days.

(21) Appl. No.: 13/538,946

(22) Filed: Jun. 29, 2012

(65) Prior Publication Data
US 2013/0237151 A1  Sep. 12, 2013

(30) Foreign Application Priority Data

Mar. 6, 2012  (TW) .............................. 101107539 A

(51) Int. Cl.
*H04B 7/00* (2006.01)
(52) U.S. Cl.
USPC ........................................ 455/41.2; 455/41.1
(58) Field of Classification Search
USPC .............................................. 455/41.1, 41.2
See application file for complete search history.

(56) References Cited

U.S. PATENT DOCUMENTS 8,406,991 B2 * 3/2013 Ohta et al. .................... 701/400

* cited by examiner

*Primary Examiner* — Tuan H Nguyen
(74) *Attorney, Agent, or Firm* — Rosenberg, Klein & Lee

(57) ABSTRACT

An automatic-switching wireless communication system and method, comprising: a first device, and a second device. The first device verifies if said second device has paired with itself through using near end wireless communication. If an answer is positive, the second device connects with the first device by near end wireless communication and requests first device to activate remote end wireless communication. Then, second device searches to find a remote end wireless communication module of the first device. In case it is found, the first device is used as a wireless base station, such that the first device and the second device transmit data by remote end wireless communication, and the second device is connected to an outside network through the first device. If the second device is outside a range of the near end wireless communication of the first device, said remote end wireless communication module is closed automatically.

11 Claims, 2 Drawing Sheets

AUTOMATIC-SWITCHING WIRELESS COMMUNICATION SYSTEM AND METHOD

BACKGROUND OF THE INVENTION

1. Field of the Invention

The present invention relates to a technology of wireless communication system, and in particular to an automatic-switching wireless communication system and method.

2. The Prior Arts

With the progress and development of Network technology, the wire network data transmission speed is increasing rapidly. Meanwhile, the emergence of wireless network has toppled the concept of conventional network that, for a network, communication can only be realized through a communication line, so the wireless network has brought convenience to the user, such that by connecting a mobile phone handset to the wireless network, the user can be connected to a computer while moving. As such, the mobile phone user can get on the network at any time, even while he is commuting or at work.

In transmitting data to another mobile phone handset, computer, or On-Board-Unit (OBU), an ordinary handset utilizes wireless network to transmit data. In general, the application of handset in wireless network can be classified into a near end wireless communication and a remote end wireless communication. The near end wireless communication includes: Bluetooth, Near Field Communication (NFC), wireless RF communication. While the remote end wireless communication includes WiFi. The near end wireless communication, such as Bluetooth or NFC is more power saving, yet its induction range is rather short of about 10 meters. Also, its transmission speed is slow. On the other hand, the induction range of WiFi is about 50 to 60 meters, but it is rather power consuming, such that its battery can not sustain long period of power-on of WiFi. For this reason, usually, a mobile phone handset powers on its Bluetooth function instead of continuously powering on WiFi. Only when it needs to transmit data thus requiring resetting of wireless network options, will it select the WiFi function. However, the actions involved in this process are tedious and complicated, thus it does not conform to time-effective requirement for the people of modern time.

Therefore, the design and performance of network wireless communication is not quite satisfactory, and it has much room for improvements.

SUMMARY OF THE INVENTION

In view of the problems and drawbacks of the prior art, the present invention provides an automatic-switching wireless communication system and method, that is power saving and convenient to use, so as to overcome the shortcomings of the prior art.

A major objective of the present invention is to provide an automatic-switching wireless communication system and method. In conducting a near end wireless communication, the first and second devices of a matching pair are connected together. Then the first device is requested to activate the remote end wireless communication, so that the first device does not have to activate the power-consuming remote end wireless communication for long period of time. In other words, it will activate the remote end wireless communication only when it is necessary (namely, when the second device is getting close) so as to save power consumption.

Another objective of the present invention is to provide an automatic-switching wireless communication system and method. Wherein, upon activating remote end wireless communication by the first device, the second device and the first device automatically establish remote end wireless communication connection, to transmit data through utilizing the fast speed data transmission of the remote end wireless communication, without the need to set up the wireless communication function for itself.

A further objective of the present invention is to provide an automatic-switching wireless communication system and method. Wherein, upon activating the remote end wireless communication by the first device, it will next activate a wireless base station mode. Then, the remote end wireless communication of the second device is connected to the first device, to use the first device as a wireless base station for connecting it to an outside network.

In order to achieve the above-mentioned objective, the present invention provides an automatic-switching wireless communication system and method, including the following steps: firstly, activate the first near end wireless communication of the first device, to search for a second device. Next, determine if the second device has paired with the first device, in case the answer is positive, utilize the second near end wireless communication of the second device to connect to the first device. Then, activate the first remote end wireless communication of the first device, and use the second remote end wireless communication of the second device, to connect to the first device, hereby realizing data transmission of the first and second devices through utilizing the first and second remote end wireless communications.

The present invention also provides an automatic-switching wireless communication system, comprising: a first device, provided with a first near end wireless communication module and a first remote end wireless communication module, to search for the second device by means of the first near end wireless communication module; and a second device, provided with a second near end wireless communication module and a second remote end wireless communication module, such that the second near end wireless communication module is connected to the first near end wireless communication module, to request activating the first remote end wireless communication module, and the second remote end wireless communication module is connected to the first remote end wireless communication module, to enable the first device and the second device to transmit data to each other.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides an automatic-switching wireless communication system and method. Wherein, near end wireless communication technology is used to connect the first device and the second device, then it activates the remote end wireless communication of the first device and the second device, so as to save the power consumed.

Figure 1:
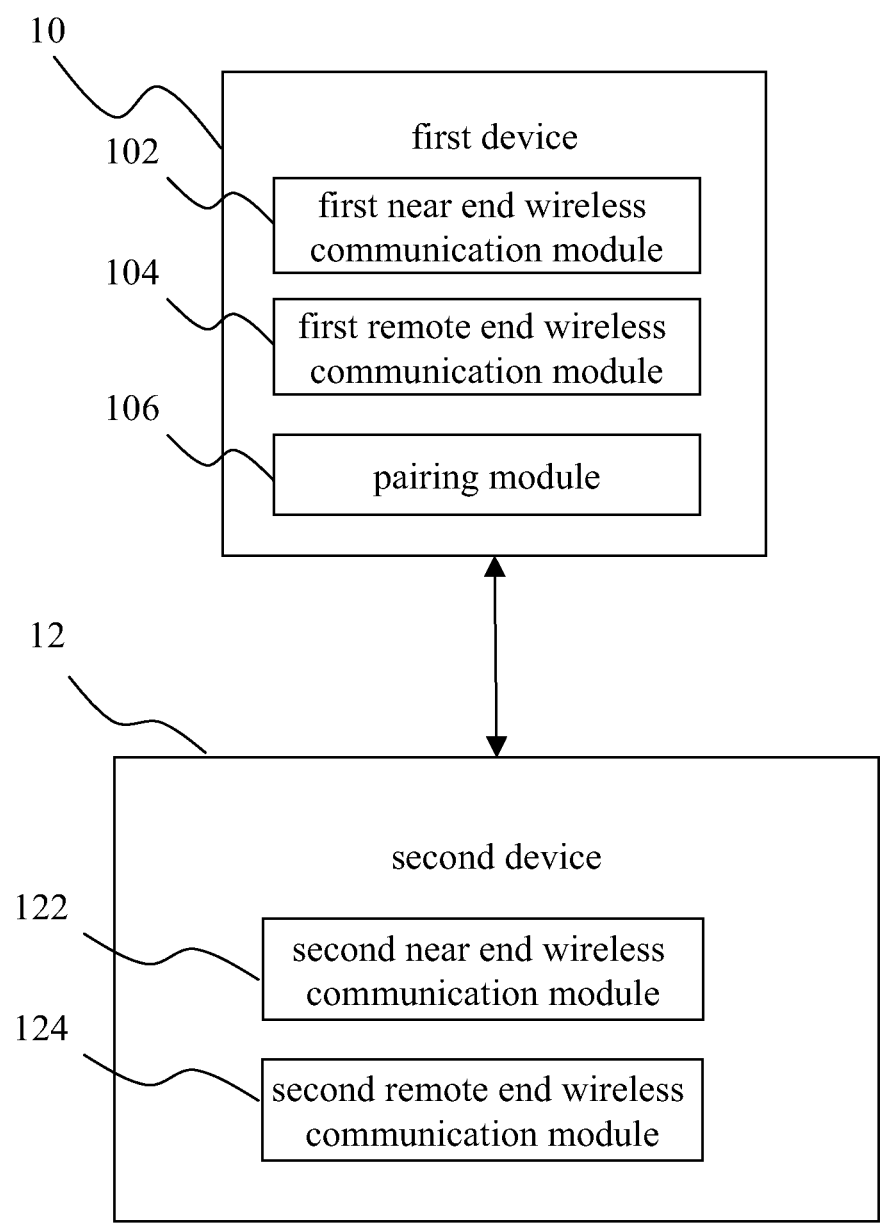
FIG. 1 is a system block diagram of an automatic-switching wireless communication system according to the present invention.
Figure 2:
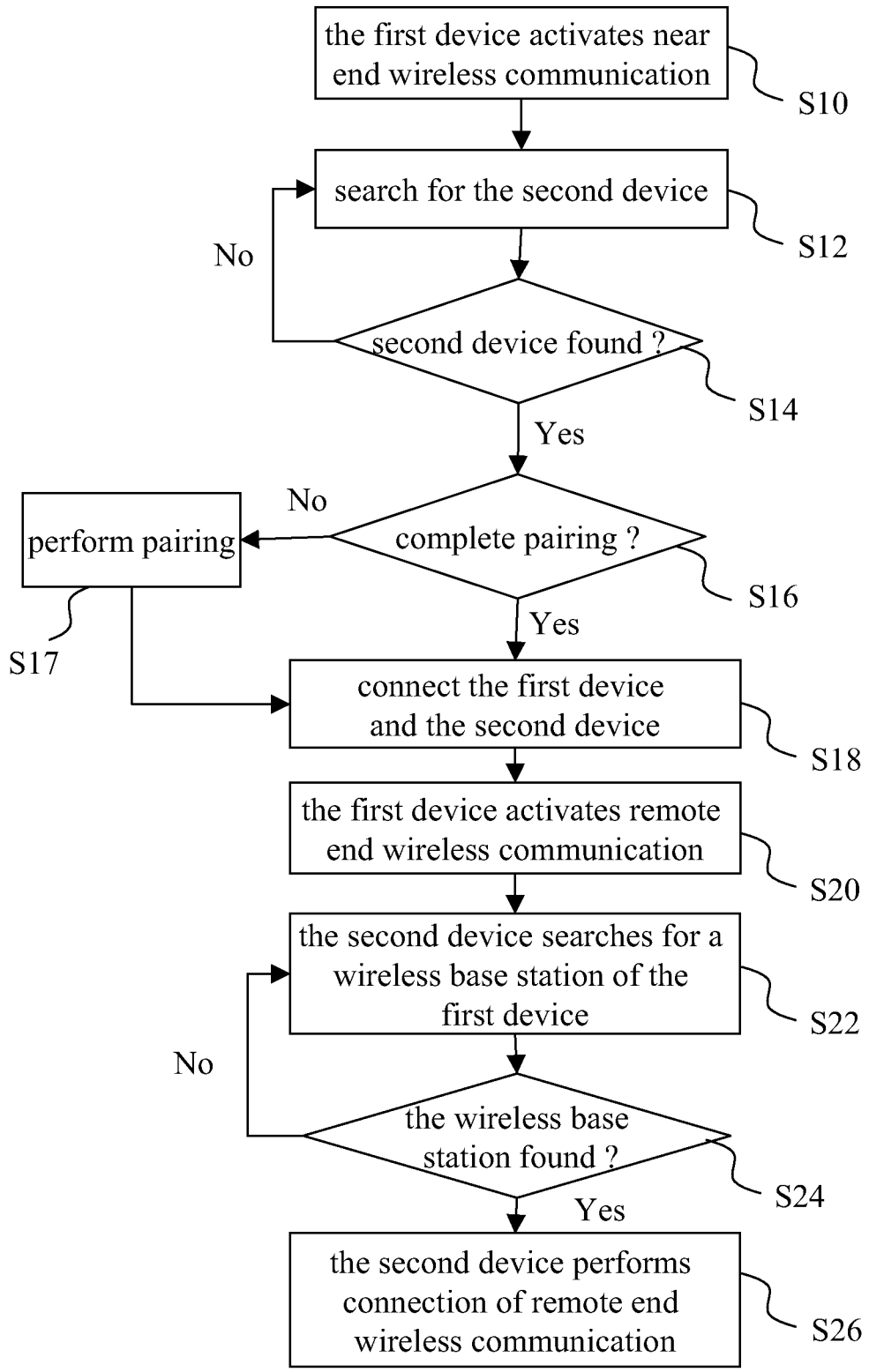
FIG. 2 is a flowchart of the steps of an automatic-switching wireless communication method according to the present invention.

Refer to FIG. 1 for a system block diagram of an automatic-switching wireless communication system according to the present invention, and also refer to FIG. 2 for a flowchart of the steps of an automatic-switching wireless communication method according to the present invention.

As shown in FIG. 1, the automatic-switching wireless communication system of the present invention includes a first device 10 and a second device 12. Wherein, the first device 10 can be a mobile device, an intelligent handset, etc., on which is provided with a first near end wireless communication module 102 and a first remote end wireless communication module 104, such that first near end wireless communication module 102 is used to search for the second device 12. Moreover, the second device 12 can be a computer, an On-Board-Unit (OBU), on which is provided with a second near end wireless communication module 122, and a second remote end wireless communication module 124, so that the second near end wireless communication module 122 is connected to the first near end wireless communication module 102, to request activating the first remote end wireless communication module 104. The second remote end wireless communication module 124 is connected to the first remote end wireless communication module 104, to transmit data at high speed. The second device is connected to an outside network (not shown) via a first remote end wireless communication module 104.

The first near end wireless communication module 102 and the second near end wireless communication module 122 are each of a wireless communication technology of Bluetooth or Near Field Communication (NFC); while the first remote end wireless communication module 104 and the second remote end wireless communication module 124 are of a WiFi technology.

The first device 10 further includes a pairing module 106. The first near end wireless communication module 102 of the first device 10 has completed the pairing operation in advance, and it generates a paired device list. In this case, for the first device, the intelligent handset is taken as an example for explanation. In the Paired Device List of the Android Operation System, the information stored has already contained paired Bluetooth device. Therefore, the pairing module 106 of the first device 10 determines if the second device 12 is in the paired device list of the first device 10. In case the answer is positive, then the first device 10 and the second device 12 are allowed to use the first near end wireless communication module 102 and the second near end wireless communication module 122 to realize connection.

Then, refer to FIG. 2 for a flowchart of the steps of an automatic-switching wireless communication method according to the present invention. As shown in FIG. 2, firstly, in step S10, the first device 10 activates a first near end wireless communication module 102. Then, in steps S12 and S14, search to find the second device 12. In case that the second device 12 is found, then proceed to step S16, otherwise return to step S12 to continue searching. Subsequently, in step S16, determine if the second device 12 thus found has been paired with the first device 10. In this step, the pairing module 106 checks the Paired Devices List stored in the first device 10, to verify that whether the second device 12 has paired with the first device 10. In case the answer is negative, then proceed to step S17, to pair the two devices according to an ordinary pairing process.

Upon completing pairing the first and second devices 10 and 12, in step S18, connect the first near end wireless communication module 102 to the second near end wireless communication module 122. For example, to establish a Series Port Profile (SSP) connection for the second device 12 and the first device 10 by means of Bluetooth. Upon successfully setting up this connection, then proceed to and execute step S20. The second device 12 will send out a message, requesting the first device 10 to activate the remote end wireless communication function of the first remote end wireless communication module 104, such as WiFi. Meanwhile, it requests that after activating the first remote end wireless communication module 104, it will enter into a base station mode, to make the first device 10 to become a wireless base station.

Then, in step S22, the second device 12 starts to search for the wireless base station. Since the first device 10 has already entered into a base station mode to become a wireless base station. Therefore, in step S24, in case the second device 12 searches for and finds the first device 10, it will then execute step S26. Otherwise, the process returns to step S22 to restart searching. In step S26, the second remote end wireless communication module 124 of the second device 12 is connected to the first remote end wireless communication module 104 of the first device 10. As such, through the high speed remote end wireless communication, data is transmitted at high speed between the first device 10 and the second device 12. In addition, since the first device 10 functions as a wireless base station, so it can share the wireless network, therefore, the second device 12 can be connected to outside network through the first device 10.

By way of example, the first device 10 is a handset, the second device is a computer, and the near end wireless communication and its remote end wireless communication are Bluetooth and Wifi respectively. Since the induction range of Bluetooth is about 10 m, and the induction range can be adjusted based on antenna design, such as 5 m. When a user enters into his office carrying a mobile phone handset, its Bluetooth is in an activation state (since Bluetooth is more power saving, so it can keep on in an activation state for a long period of time). Or when the user enters into the office, he activates the Bluetooth, and when the user walks into within 10 meters from the computer, his handset will search for the Bluetooth of the computer, and it will check the Bluetooth pairing of the handset and the computer. If the pairing is correct, then Bluetooth connection is established for the handset and the computer. Meanwhile, the handset will automatically activate its WiFi, to become a wireless base station to share 3G wireless network. After the computer searches and finds WiFi base station of the handset, it will connect to the WiFi of the handset. Since the data transmission speed of WiFi is faster, and the data transmission speed of Bluetooth is slower. Therefore, the data transmission between handset and computer is realized through WiFi, and the computer can be connected to the outside network through using the handset as wireless base station.

In the present invention, when the first and second near end wireless communication modules of the first and second devices are disconnected, namely, when they are out of the induction range, the first and second remote end wireless communication modules of the first and second devices are closed automatically. The embodiment mentioned above is taken as an example. When the user leaves the office, and his handset is away from the computer for more than 10 meters, the WiFi of his handset and the computer are closed automatically. For the handset battery that can not sustain long period of operation, since the power consumption of Bluetooth is rather small, so it can be activated and powered on for a long time and still has sufficient power supply. On the other hand, keeping the WiFi activated and powered on will soon exhaust its power. Therefore, when the handset is away from the computer for more than 10 meters, its WiFi will be closed automatically, to achieve power saving.

Summing up the above, the present invention provides an automatic-switching wireless communication system and method. Wherein, the near end wireless communications (for example, Bluetooth and NFC) of the first and second devices are paired and then connected, and the near end wireless communication connection of the second device are set to send out request, to request the first device to activate the remote end wireless communication (such as WiFi) and enter into a wireless base station mode, so that the remote end wireless communication of the second device can be connected to the first device. For the second device, in addition to being connected to the first device to utilize its remote end wireless communication to transmit data at high speed, it can also be connected to the outside network through the first device. Since the remote end wireless communication consumes large amount of power, in the present invention, usually, the first device are not required to activate its remote end wireless communication, and only when the second device is getting close will it be activated automatically and be connected thereto. Moreover, when the distance between the first device and the second device exceeds the induction range of near end wireless communication, the remote end wireless communication will be closed automatically, to achieve power saving significantly. In the design of the present invention, there is no need for the user to switch manually between the near end and remote end wireless communications, instead, the remote end wireless communication of high speed transmission is activated automatically to save time and effort of the user.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An automatic-switching wireless communication method, comprising the following steps:
   configuring a first device with a first near end wireless communication module and a first remote end wireless communication module;
   configuring a second device with a second near end wireless communication module and a second remote end wireless communication module;
   activating said first near end wireless communication of said first device to search for said second device;
   upon finding said second device, determining whether said second device has paired with said first device, and establishing a second near end wireless communication of said second device with said first device if said second and first devices have been paired;
   sending, from said second device to said first device, a request to activate said first remote end wireless communication module when said first and second devices are disposed within a predetermined induction range one from another, and activating said first remote and wireless communication module of said first device; and
   subsequently to activation of said first remote end wireless communication module, entering said first remote end wireless communication module into a base station mode of operation, thereby actuating an operation of said first device as a wireless base station connected to an outside network;
   searching, by utilizing said second near end wireless communication module of said second device, said first remote end wireless communication module, and connecting said second remote end wireless communication module of said second device to said wireless base station;
   utilizing said first and second remote end wireless communication modules to perform data transmission between said first device and said second device and to operatively connect said second device to said outside network through said first device; and
   once said first and second devices are separated by a distance exceeding said predetermined induction range, automatically deactivating said first and second remote end wireless communication modules of said first and second devices.

2. The automatic-switching wireless communication method as claimed in claim 1, wherein said first near end wireless communication and said second near end wireless communication are provided respectively by said first near end wireless communication module and said second near end wireless communication module, respectively, and wherein said first near end wireless communication module and said second near end wireless communication module operate based on wireless communication technologies of Bluetooth or Near Field Communication (NFC).

3. The automatic-switching wireless communication method as claimed in claim 1, wherein said first remote end wireless communication module and said second remote end wireless communication module are based on a WiFi technology.

4. The automatic-switching wireless communication method as claimed in claim 1, wherein said first device pairs with said first near end wireless communication to generate a paired device list.

5. The automatic-switching wireless communication method as claimed in claim 4, wherein said first device further includes a pairing module configured to determine whether said second device is included in said paired device list.

6. The automatic-switching wireless communication method as claimed in claim 1, wherein where said second device has not paired with said first device, performing the pairing of said second device with said first device to connect said second device to said first device.

7. An automatic-switching wireless communication system, comprising:
   a first device, configured with a first near end wireless communication module and a first remote end wireless communication module, and
   a second device configured with a second near end wireless communication module and a second remote end wireless communication module, wherein said first near end wireless communication module of said first device is configured to search for said second device, and wherein said second near end wireless communication module is connected to said first near end wireless communication module, wherein said second near end wireless communication module is configured to request an activation of said first remote end wireless communication module once said first and second devices are within a predetermined induction distance one from another, and wherein said second remote end wireless communication module is connected to said first remote end wireless communication module to perform data transmission between said first device and said second device, and wherein said first device operates in a wireless base station mode once said first remote end in wireless communication module is activated, and wherein said second device is configured to search said first remote end wireless communication module through using said second remote end wireless communication module, and, upon finding said first remote end wireless communication module said second device proceeds with connection and data transmission through using said first device as said wireless base station, and wherein, once said first and second devices are separated by a distance exceeding said predetermined induction distance, the connection between said first near end wireless communication module and said second near end wireless communication module is disconnection, and said first remote end wireless communication module and said second remote end wireless communication module are deactivated automatically.

8. The automatic-switching wireless communication system as claimed in claim 7, wherein said first near end wireless communication module and said second near end wireless communication module are based on wireless communication technologies of Bluetooth or Near Field Communication (NFC).

9. The automatic-switching wireless communication system as recited in claim 7, wherein said first remote end wireless communication module and said second remote end wireless communication module are based on a WiFi technology.

10. The automatic-switching wireless communication system as claimed in claim 7, wherein said first device pairs first with said first near end wireless communication module to generate a paired device list, and wherein said first device further includes a pairing module to determine whether said second device is included in said paired device list.

11. The automatic-switching wireless communication system as claimed in claim 7, wherein, after said second near end wireless communication module is connected to said first near end wireless communication module, said second device is configured to send out a message, requesting said first device to activate said first remote end wireless communication module.

\* \* \* \* \*